(12) United States Patent
Oswal et al.

(10) Patent No.: US 7,536,187 B2
(45) Date of Patent: May 19, 2009

(54) SUPPORTING COMMUNICATION SESSIONS AT A MOBILE NODE

(75) Inventors: Anand K. Oswal, Santa Clara, CA (US); Viren K. Malaviya, Cupertino, CA (US); John G. Waclawsky, Frederick, MD (US); David P. Lindert, San Jose, CA (US); Jayaraman R. Iyer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 355 days.

(21) Appl. No.: 11/209,311

(22) Filed: Aug. 23, 2005

(65) Prior Publication Data

US 2007/0049284 A1 Mar. 1, 2007

(51) Int. Cl.
*H04Q 7/20* (2006.01)

(52) U.S. Cl. ............... 455/452.1; 455/422.1; 455/432.1; 455/435.1; 455/436; 370/310; 370/328; 370/329; 370/331

(58) Field of Classification Search ............... 455/422.1, 455/432.1, 435.1, 436, 450, 452.1; 370/310, 370/328, 329, 331
See application file for complete search history.

(56) References Cited

U.S. PATENT DOCUMENTS

| | | | | |
|---|---|---|---|---|
| 5,239,676 A | * | 8/1993 | Strawczynski et al. | 455/437 |
| 5,285,447 A | * | 2/1994 | Hulsebosch | 370/332 |
| 5,301,356 A | * | 4/1994 | Bodin et al. | 455/436 |
| 6,262,976 B1 | * | 7/2001 | McNamara | 370/254 |
| 6,282,182 B1 | * | 8/2001 | Pecen et al. | 370/336 |
| 6,519,461 B1 | * | 2/2003 | Andersson et al. | 455/453 |
| 6,834,050 B1 | * | 12/2004 | Madour et al. | 370/392 |
| 6,973,102 B2 | * | 12/2005 | Karagiannis et al. | 370/516 |
| 6,985,442 B1 | * | 1/2006 | Wang et al. | 370/232 |
| 7,006,437 B2 | * | 2/2006 | Ogier et al. | 370/230.1 |
| 7,089,033 B2 | * | 8/2006 | Leinonen et al. | 455/553.1 |
| 2002/0126633 A1 | * | 9/2002 | Mizutani et al. | 370/329 |
| 2004/0215766 A1 | * | 10/2004 | Haddad | 709/224 |
| 2005/0025164 A1 | * | 2/2005 | Kavanagh et al. | 370/401 |
| 2005/0195741 A1 | * | 9/2005 | Doshi et al. | 370/230 |
| 2005/0265308 A1 | * | 12/2005 | Barbir et al. | 370/351 |
| 2006/0072589 A1 | * | 4/2006 | Mandavilli et al. | 370/400 |

OTHER PUBLICATIONS

Thor Olavsrud, "*Intel Pledges to Develop WiMAX Silicon*", Wi-Fi Planet, www.wi.fiplanet.com/news/article, 5 pages, Jul. 9, 2003.
"*The Cisco Position on Wimax and Related Next-Generation Radio Technologies for Mobile Operators*", Solution Overview, Cisco Systems, Inc., © 2004 Cisco Systems, Inc., 4 pages, 2004.

(Continued)

*Primary Examiner*—Stephen M D'Agosta
(74) *Attorney, Agent, or Firm*—Baker Botts L.L.P.

(57) ABSTRACT

Supporting communication sessions at a mobile node includes determining at a mobile node an address for one or more interior network elements of a network system. A interior network element is distinct from an edge network element of the network system, and is operable to establish a communication session. An address for an interior network element is inserted into packets. The packets are sent from the mobile node to the interior network element to communicate directly with the interior network element. The communication session is established using the interior network element.

16 Claims, 2 Drawing Sheets

OTHER PUBLICATIONS

"*This is Cisco On the Move*", Cisco Systems, Inc., © 2005 Cisco Systems, Inc., 8 pages, Jan. 2005.

Chenwei Yan, "*Five Reasons Why TD-CDMA Outshines WiMAX in Wireless Broadband*", http://www.commsdesign.com/printableArticle/, CommsDesign, 3 pages, Feb. 14, 2005.

"*Navini Networks Brings Portability to 3.5GHZBand*", Press Release, Navini Networks, Inc., http://www.navini.com/pages/press/2005, 2 pages, Apr. 6, 2005.

"*The Technology Vision for WiMax*", Intel and WiMAX Acceleration Wireless Broadband, © 2005 Intel Corporation, WiMAX Forum, http://www.intel.com/standards/case; 7 pages, Printed Aug. 20, 2005.

"*UMTS TDD versus WiMAX Which Standard Will Rule Next-Generation Broadband Wireless?*", http://axity3g.axcera.com/umts_vs_wimax.pdf, 2 pages, Printed Aug. 20, 2005.

\* cited by examiner

SUPPORTING COMMUNICATION SESSIONS AT A MOBILE NODE

TECHNICAL FIELD

This invention relates generally to the field of telecommunications and more specifically to supporting communication sessions at a mobile node.

BACKGROUND

A communication network system provides communication sessions for mobile nodes. Network elements of the system support the communication session. As an example, access points may hand off a communication session for a mobile node as the mobile node moves through the network system. Known techniques for supporting communication sessions, however, are typically not efficient in certain situations. In general, it is desirable to have efficient techniques for supporting communication sessions.

SUMMARY OF THE DISCLOSURE

In accordance with the present invention, disadvantages and problems associated with previous techniques for supporting communication sessions at a mobile node may be reduced or eliminated.

According to one embodiment of the present invention, supporting communication sessions at a mobile node includes determining at a mobile node an address for a first interior network element of a network system. The first interior network element is distinct from an edge network element of the network system, and is operable to establish a first communication session. The address is inserted into packets. The packets are sent from the mobile node to the first interior network element to communicate directly with the first interior network element. The first communication session is established using the first interior network element.

Certain embodiments of the invention may provide one or more technical advantages. A technical advantage of one embodiment may be that a mobile node may bypass an edge network element and communicate directly with an interior network element. Bypassing the edge network element may reduce the workload of the edge network element. In addition, directly communicating with the interior network element may reduce the overall number of messages that are sent in a communication network system.

Another technical advantage of one embodiment may be that a mobile node may obtain information that may be used to establish a communication session. The mobile node may use the information to establish a communication session, which may reduce reliance on the network elements. Another technical advantage of one embodiment may be that a mobile node may execute decision procedures to select a communication path, which may reduce reliance on the network elements.

Another technical advantage of one embodiment may be that a mobile node may establish different communication sessions with different communication paths. Accordingly, the mobile node may be able to communicate with different types of networks. In addition, the mobile node may be able to communicate using different types of packets along different communication paths.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
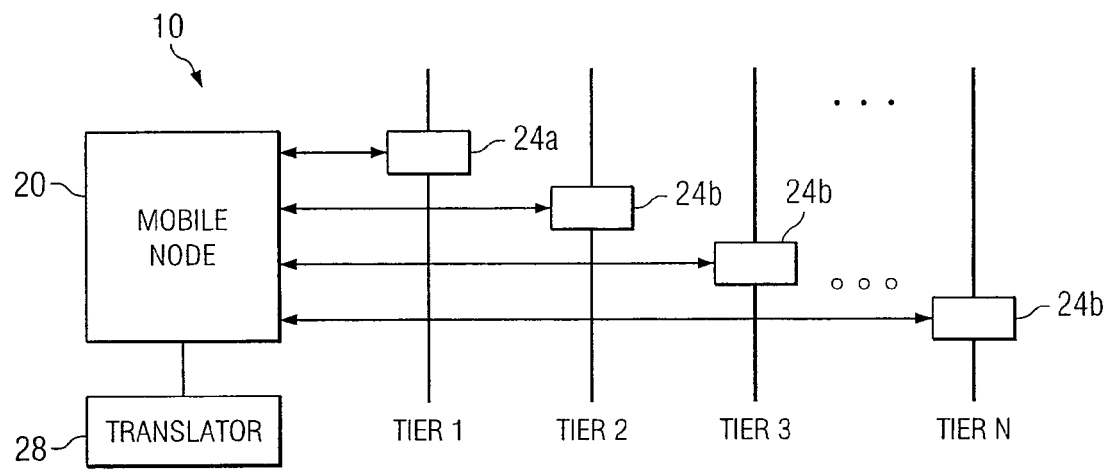
FIG. 1 is a block diagram illustrating one embodiment of a network system that includes an endpoint mobile node operable to communicate with a network element of any suitable tier of the network system.

FIG. 1 is a block diagram illustrating one embodiment of a network system 10 that includes an endpoint mobile node 20 operable to communicate with a network element 24 of any suitable tier of network system 10. According to the embodiment, mobile node 20 may bypass an edge network element 24a and communicate directly with an interior network element 24b. Bypassing the edge network element 24a may reduce the workload of the edge network element 24a. In addition, directly communicating with the interior network element 24b may reduce the overall number of control messages that are sent in network system 10.

According to the embodiment, system 10 operates to provide services, such as communication sessions, to endpoints such as mobile node 20. A communication session may refer to an active communication between endpoints, measured from endpoint to endpoint. A communication session may use one or more communication paths. A communication path may refer to the route that a signal takes from a transmitter to a receiver, including intermediate network elements 24.

Information is communicated during a communication session. Information may refer to voice, data, text, audio, video, multimedia, web page, control, signaling, other information, or any combination of the preceding. Information may be communicated in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets.

System 10 may utilize communication protocols and technologies to provide the communication sessions. Example communication protocols and technologies include those set by the Institute of Electrical and Electronics Engineers, Inc. (IEEE) 802.xx standards such as 802.11 and 802.16 standards, International Telecommunications Union (ITU-T) standards, European Telecommunications Standards Institute (ETSI) standards, Internet Engineering Task Force (IETF) standards, or other standards.

System 10 includes components such as devices. In general, a device may include any suitable arrangement of components operable to perform the operations of the device. As an example, a device may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

According to the illustrated embodiment, system 10 includes mobile node 20, tiers of network elements 24, and a translator 28 coupled as shown. Mobile node 20 represents any suitable device operable to communicate with system 10. Mobile node 20 may comprise, for example, a personal digital assistant, a computer such as a laptop, a cellular telephone, a mobile handset, or any other device operable to communicate with system 10.

Mobile node 20 may have a mobile node identifier that uniquely identifies mobile node 20. A mobile node identifier may comprise, for example, a medium access control (MAC) address, an Internet Protocol (IP) address, a telephone number, other identifier that uniquely identifies mobile node 20, or any combination of the preceding.

Mobile node 20 may communicate directly with network elements 24 of any suitable tier. Mobile node 20 may communicate directly with a network element 24 by sending packets directly to the network element 24 by inserting the address of network element 24 into the packets. According to one embodiment, mobile node 20 may bypass an edge network element 24a and communicate directly with an interior network element 24b. Mobile node 20 may perform other operations. As an example, mobile node 20 may obtain and share information that may be used to establish a communication session. As another example, mobile node 20 may execute decision procedures to select a communication path. An example mobile node 20 is described with reference to FIG. 3.

Network elements 24 are located at tiers of network system 10. A tier may refer to a level of a hierarchy of network elements 24 along a communication path. The network elements 24 of a particular tier may perform particular operations to process packets during a communication session. The operations may be used to allow packets to access a network, route packets within a network, or send packets to another network.

Network elements 24 may be organized in a hierarchy having any suitable number of tiers, and may be organized in any suitable manner. As a first example, a first hierarchy of network elements 24 may include a number of tiers, and a second hierarchy of the network elements 24 may include a different number of tiers. As a second example, a tier of the first hierarchy may include the network elements 24 of more than one tier of the second hierarchy.

According to the illustrated embodiment, system 10 includes N tiers, such as Tier 1, Tier 2, Tier 3, through Tier N. Tier 1 may include edge network elements 24a that operate to provide access to a network through a radio frequency link, and to couple a wireless network to a wired network. Example Tier 1 network elements 24 may include access points and base transceiver stations. Tier 1 network elements 24 may provide wireless services to mobile node 20 present in the region serviced by the network elements 24. A region may refer to, for example, a cell of a cellular network or a hot spot of a wireless network. A mobile node 20 may be present in the region of a network element 24 if mobile node 20 is within the range of a transceiver of the network element 24.

Tiers 2 and beyond may include interior network elements 24b that are logically farther away from mobile node 20 than Tier 1 network elements 24. Tier 2 may include network elements 24 that operate to manage packets received from Tier 1 network elements 24. Management of packets may include routing packets. Example Tier 2 network elements 24 may include base station controllers, access zone routers, and radio network controllers. Tier 3 may include network elements 24 that operate to send the packets to another network. Sending packets may include performing protocol conversion on the packets. Example Tier 3 network elements 24 may include serving GPRS support nodes, gateways, and mobile anchor points.

Other interior network elements 24b may include home agents, foreign agents, and authorization servers. A home agent of mobile node 20 may refer to an agent that maintains the address of mobile node 20 and forwards data to the mobile node 20. A foreign agent of mobile node 20 may refer to an agent that provides the home agent of mobile node 20 with an address to which data for mobile node 20 may be forwarded. An authorization server may represent any suitable device operable to provide authorization-related services, such as authentication, authorization, accounting, or any suitable combination of the preceding.

Translator 28 may provide mobile node 20 with a communication procedure. A communication procedure for a network element 24 may instruct mobile node 20 on how to communicate with network element 24. A communication procedure may include any suitable information. As a first example, the communication procedure may designate the protocol to use to communicate with network element 24. As a second example, communication procedure may describe the type of information, such as security information, required by network element 24. As a third example, the communication procedure may also include information about intervening network elements 24 that may need to be contacted in order to communicate with the network element 24.

According to one embodiment, translator 28 may include an authenticator that operates to authenticate mobile node 20. Translator 28 may authenticate mobile node 20 for communication with a network element 24 before providing mobile node 20 with the communication procedure for with the network element 24.

Modifications, additions, or omissions may be made to system 10 without departing from the scope of the invention. The components of system 10 may be integrated or separated according to particular needs. Moreover, the operations of system 10 may be performed by more, fewer, or other modules. Additionally, operations of system 10 may be performed using any suitable logic. As used in this document, "each" refers to each member of a set or each member of a subset of a set.

Figure 2:
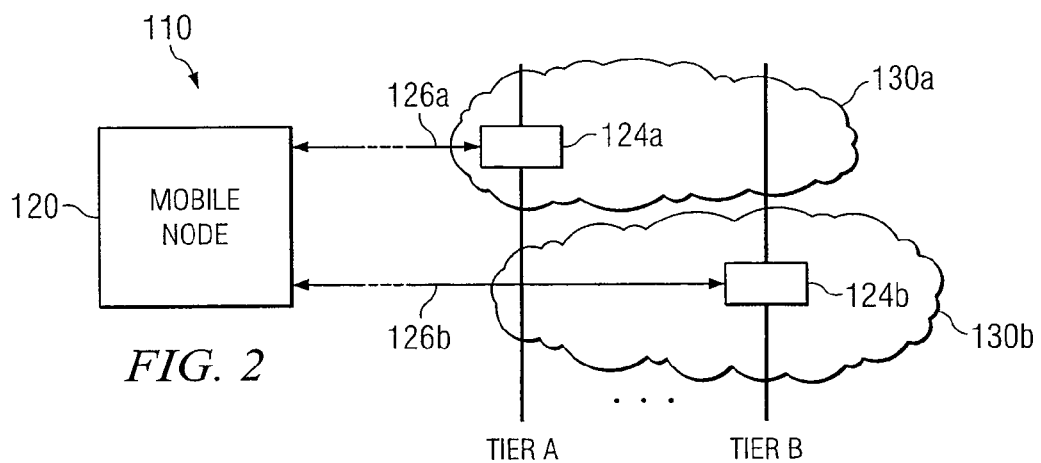
FIG. 2 is a block diagram illustrating one embodiment of a network system that includes an endpoint mobile node operable to communicate with network elements of different networks.

FIG. 2 is a block diagram illustrating one embodiment of a network system 110 that includes an endpoint mobile node 120 operable to communicate with network elements 124 of different networks 130. According to the embodiment, mobile node 120 may be substantially similar to endpoint mobile node 20 of FIG. 1, and network elements 124 may be substantially similar to network elements 24 of FIG. 1.

Network 130 represents a communication network that allows devices such as mobile node 120 to communicate with other devices. A communication network may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

Networks 130a and 130b may include different network technologies. A network technology may refer to logic that operates according to a particular procedure. According to one embodiment, network 130a may operate according to a code division multiple access (CDMA) technology, and network 130b may operate according to a fixed cable access protocol. Networks 130a and 130b may be operated by different service providers.

According to the illustrated embodiment, network element 124a belongs to network 130a, and network element 124b belongs to network 130b. Network element 124a belongs to tier A, and network element 124b belongs to tier B, where B may be equal to or not equal to A. That is, network elements 124a and 124b may belong to the same tier or to different tiers.

Network 130a may provide a first communication session 126a, and network 130b may provide a second communication session 126b. The communication sessions may be different in any suitable manner. As a first example, the communication sessions may provide different services. As a second example, the communication sessions may communicate different types of information. According to one embodiment, data may be communicated over communication session 126a, and control messages may be communicated over communication session 126b.

Mobile node 120 may have an IP address for each communication path. As an example, mobile node 120 may have a first IP address for data packets, and a second IP address for control packets. The header of a Session Initiation Protocol (SIP) session message may be used to notify network elements 124 of the IP addresses.

Modifications, additions, or omissions may be made to system 110 without departing from the scope of the invention. The components of system 110 may be integrated or separated according to particular needs. Moreover, the operations of system 110 may be performed by more, fewer, or other modules. Additionally, operations of system 110 may be performed using any suitable logic comprising software, hardware, other logic, or any suitable combination of the preceding.

Figure 3:
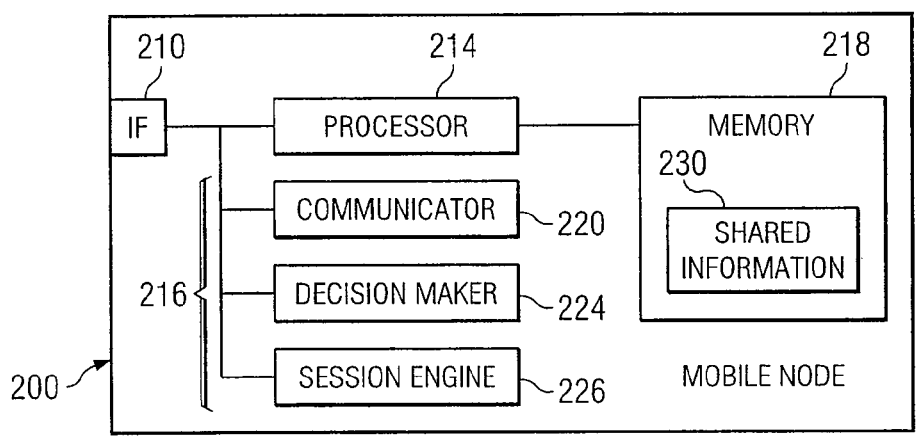
FIG. 3 is a block diagram illustrating one embodiment of an endpoint mobile node that may be used with the network system of FIG. 1 or the network system of FIG. 2.

FIG. 3 is a block diagram illustrating one embodiment of an endpoint mobile node 200 that may be used with a system such as network system 10 of FIG. 1 or network system 110 of FIG. 2. According to the illustrated embodiment, mobile node 200 includes an interface 210, a processor 214, engines 216, and a memory 218 coupled as shown. Engines 216 include a network element communicator 220, a decision maker 224, and a session engine 226, and memory 218 stores shared information 230.

Network element communicator 220 may be used to communicate directly with network elements of any suitable tier. Communicator 220 may communicate directly with a network element using a communication procedure for the network element, which may be provided by a translator. Communicator 220 may communicate directly with a network element by inserting the address of the network element into packets for the network element.

Decision maker 224 may execute decision procedures to select a communication session. A decision procedure may be based on any suitable decision parameter, such as a location, a capacity, a financial consideration, or other parameter for selecting a path, or any combination of the preceding. Location parameters may be used to select a path based on the location of mobile node 200 with respect to the network elements of the path. Capacity parameters may be used to select a path based on the available capacity at the network elements of the path.

Financial parameters may be used to select a path based on the cost of the communication session using the path. Financial parameters may designate, for example, a cost per unit of usage. Examples include a cost per packet or megabyte; a cost for type of packets such as User Datagram Protocol (UDP), Transmission Control Protocol (TCP), or Internet Protocol (IP) packets; a cost for packet length; a cost for particular bandwidth speed; a cost for using a virtual private network (VPN) tunnel; or a cost for a particular priority level or quality of service.

The decision procedure may be established by any suitable party. As a first example, a user of the mobile node 200 may program mobile node 200 with a decision procedure. As a second example, a company may establish the decision procedures for mobile nodes 200 owned by the company and used by employees. As a third example, the manufacturer of mobile node 200 may store the decision procedure in mobile node 200.

Decision maker 224 may also be used to determine when to select a communication session. As a first example, a communication session may be selected when mobile node 200 is turned on. As a second example, a next communication session may be selected during a handover procedure. A handover procedure may refer to the process by which a communication session for mobile node 200 is passed from a first Tier 1 network element to a second Tier 1 network element as mobile node 200 moves from a first region of the first element to a second region of the second element.

Session engine 226 may be used to establish a communication session, and may have knowledge of the communication session options. Session engine 226 may have the options in memory or may discover the options available in the region in which mobile node 200 is present. Session engine 226 may use decision maker 224 to select a communication session.

According to one embodiment, session engine 226 may establish multiple communication sessions that operate simultaneously. Mobile node 200 may simultaneously communicate different types of packets using the communication sessions. In addition, multiple communication sessions may be established to perform a handover procedure. Mobile node 200 may leave one communication session to join the other communication session.

Shared information 230 may refer to information that may be shared between mobile node 200 and a network element. Typically, the information may be used to establish a communication session or communicate over a communication path. Shared information 230 may be gathered while mobile node 200 is communicating with a first network element of a first communication path. Mobile node 200 may provide shared information 230 to a second network element when communicating over a second communication path.

Shared information 230 may include mobile node information, session information, network information, or other information. Mobile node information describes a mobile node. As a first example, the mobile node information may include a mobile node identifier or pointers to user contact information. As a second example, the mobile node information may include the context and state of the mobile node.

Session information may include information that describes communication sessions, such as previous or current communication sessions. As a first example, session information may describe networks used during a session, such as network attachment points of the networks. As a second example, the session information may describe the service flows of a session. As a third example, the session information may include caching information such as pointers to caching locations. As a fourth example, the session information may include accounting information that describes the usage of resources by a mobile node.

As a fifth example, the session information may include network element information that describes network elements. Network element information may include the addresses of the network elements with which mobile node may be allowed to communicate. As a sixth example, the session information may include mobility information. The mobility information may allow for mobile mode 200 to move within a particular range, for example, a range within the control of selected Tier 1, Tier 2, or Tier N network elements.

Security information includes information that may be used for security operations. As a first example, the security information may include a security context. As a second example, security information may include an identifier of an authenticator that may be used to authenticate a mobile node. As a third example, security information may include authentication or encryption keys or tokens.

Modifications, additions, or omissions may be made to mobile node 200 without departing from the scope of the invention. The components of mobile node 200 may be integrated or separated according to particular needs. Moreover, the operations of mobile node 200 may be performed by more, fewer, or other modules. For example, the operations of network element communicator 220 and decision maker 224 may be performed by one module, or the operations of decision maker 224 may be performed by more than one module. Additionally, operations of mobile node 200 may be performed using any suitable logic comprising software, hardware, other logic, or any suitable combination of the preceding.

Figure 4:
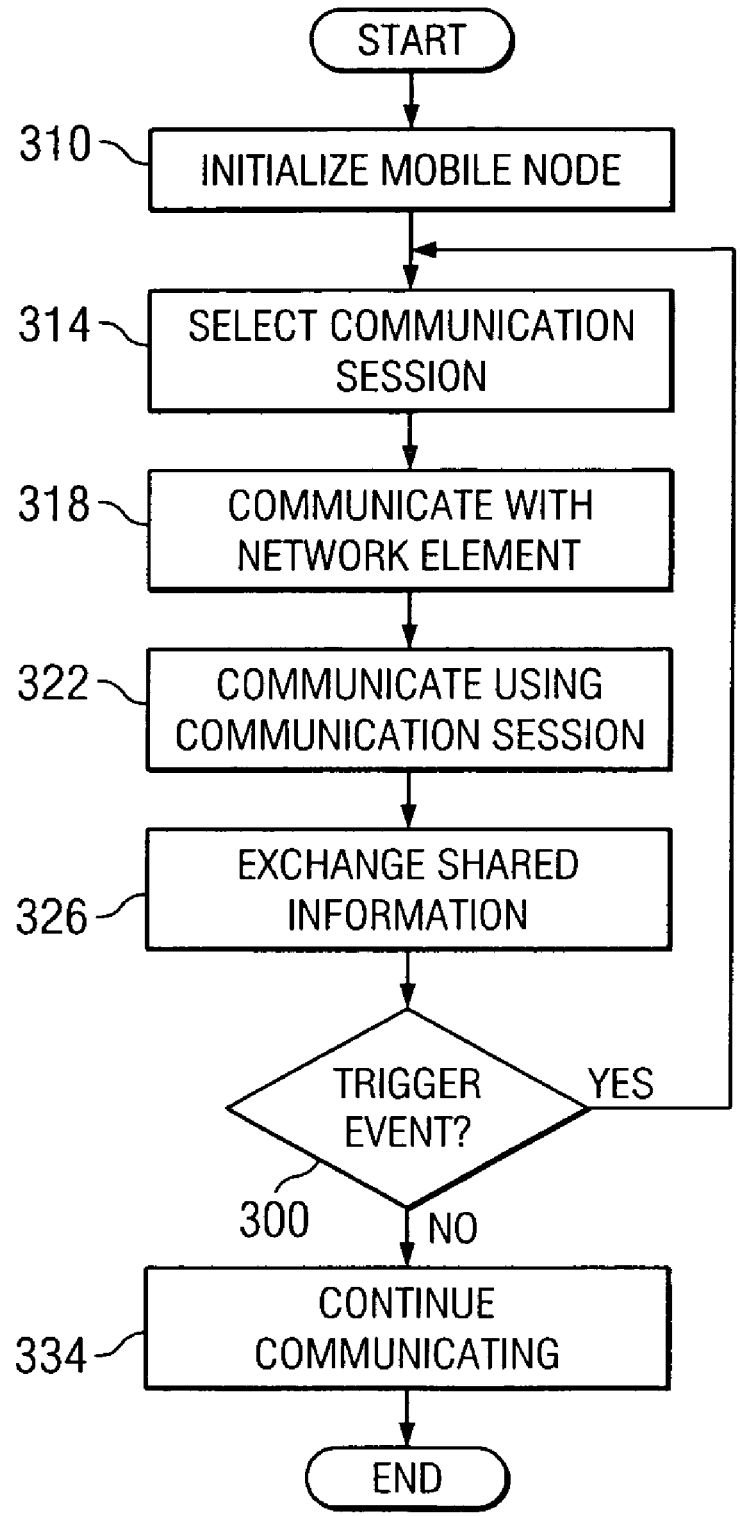
FIG. 4 is a flowchart illustrating one embodiment of method of supporting mobility at a mobile node that may be used with the network system of FIG. 1 or the network system of FIG. 2.

FIG. 4 is a flowchart illustrating one embodiment of method of supporting mobility at a mobile node 200 that may be used with a system such as network system 10 of FIG. 1 or network system 110 of FIG. 2.

The method begins at step 310, where mobile node 200 is initialized. Mobile node 200 may be initialized by being turned on or by entering a network system. Mobile node 200 selects a communication session at step 314. The communication session may be selected in any suitable manner. For example, mobile node 200 may select a communication session associated with an available Tier 1 network element, or may perform a decision procedure to select a communication session 24.

Mobile node 200 communicates with a network element to establish the selected communication session 318. Mobile node 200 may communicate with the network element by executing a communication procedure associated with the network element. Mobile node 200 and network element communicate using the communication session at step 322.

Information is shared between mobile node 200 and the network element at step 326. Shared information may be used by mobile node 200 to establish and maintain a communication path. The network element may provide information, such as security tokens, network element identifiers, or mobility information, to mobile node 200. The network element may use the shared information to retrieve data from previous network attachments if needed.

A trigger event may occur at step 330. A trigger event may include an event that indicates that a next communication session should be selected. For example, a trigger event may include an event that initiates a handover procedure to performed in response to roaming or to an interference level. If a trigger event occurs at step 330, the method returns to step 314, where a next communication path is selected. If there is no trigger event at step 330, the method proceeds to step 334, where mobile node 200 and the network element continue communication over the communication path. After continuing communication, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a mobile node may bypass an edge network element and communicate directly with an interior network element. Bypassing the edge network element may reduce the workload of the edge network element. In addition, directly communicating with the interior network element may reduce the overall number of messages that are sent in a communication network system.

Another technical advantage of one embodiment may be that a mobile node may obtain information that may be used to establish a communication session. The mobile node may use the information to establish a communication session, which may reduce reliance on the network elements. Another technical advantage of one embodiment may be that a mobile node may execute decision procedures to select a communication path, which may reduce reliance on the network elements.

Another technical advantage of one embodiment may be that a mobile node may establish different communication sessions with different communication paths. Accordingly, the mobile node may be able to communicate with different types of networks. In addition, the mobile node may be able to communicate using different types of packets along different communication paths.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for supporting one or more communication sessions at a mobile node, comprising:
   identifying a plurality of available communication sessions;
   receiving, at a mobile node, shared information from a Tier 1 element of a first network system, the shared information comprising a network element address and session information, the network element address identifying a Tier 2 network element of a second network system, the session information identifying at least one network attachment point used by the mobile node to connect to the first network system;

executing a decision procedure to select a second communication session from the plurality of available communication sessions;

inserting, by the mobile node, the network element address into a plurality of packets to bypass the Tier 1 network element to communicate directly with the Tier 2 network element;

inserting, by the mobile node, the session information into the packets;

sending the plurality of packets from the mobile node to the Tier 2 network element to establish the second communication session, the Tier 2 network element configured to retrieve data from the network attachment point to establish the second communication session; and establishing the second communication session using the Tier 2 network element.

2. The method of claim 1, further comprising:
communicating a first plurality of packets using the first communication session while communicating a second plurality of packets using the second communication session.

3. The method of claim 1, further comprising:
communicating a first plurality of packets using the first communication session while communicating a second plurality of packets using the communication session, the first plurality of packets communicating a first type of information, the second plurality of packets communicating a second type of information.

4. The method of claim 1, further comprising:
terminating the first communication session to perform a handover procedure.

5. A mobile node operable to support one or more communication sessions, comprising:
a memory operable to store information; and
a processor coupled to the memory and operable to:
identify a plurality of available communication sessions;
receive shared information from a Tier 1 element of a first network system, the shared information comprising a network element address and session information, the network element address identifying a Tier 2 network element of a second network system, the session information identifying at least one network attachment point used by the mobile node to connect to the first network system;
execute a decision procedure to select a second communication session from the plurality of available communication sessions;
insert the network element address into a plurality of packets to bypass the Tier 1 network element to communicate directly with the Tier 2 network element;
insert the session information into the packets;
send the plurality of packets to the Tier 2 network element to establish a second communication session, the Tier 2 network element configured to retrieve data from the network attachment point to establish the second communication session; and
facilitate initiation of the second communication session using the Tier 2 network element.

6. The mobile node of claim 5, the processor further operable to:
communicate a first plurality of packets using the first communication session while communicating a second plurality of packets using the second communication session.

7. The mobile node of claim 5, the processor further operable to:
communicate a first plurality of packets using the first communication session while communicating a second plurality of packets using the second communication session, the first plurality of packets communicating a first type of information, the second plurality of packets communicating a second type of information.

8. The mobile node of claim 5, the processor further operable to:
terminate the first communication session to perform a handover procedure.

9. The mobile node of claim 5, the processor further operable to:
establish the second communication session using the Tier 2 network element, the second communication session distinct from the first communication session;
communicate a first plurality of packets using the first communication session while communicating a second plurality of packets using the second communication session, the first plurality of packets communicating a first type of information, the second plurality of packets communicating a second type of information; and
terminate the first communication session to perform a handover procedure.

10. A system for supporting one or more communication sessions at a mobile node, comprising:
means for identifying a plurality of available communication sessions;
means for receiving, at a mobile node, shared information from a Tier 1 element of a first network system, the shared information comprising a network element address and session information, the network element address identifying a Tier 2 network element of a second network system, the session information identifying at least one network attachment point used by the mobile node to connect to the first network system;
means for executing a decision procedure to select a second communication session from the plurality of available communication sessions;
means for inserting, by the mobile node, the network element address into a plurality of packets to bypass the Tier 1 network element to communicate directly with the Tier 2 network element;
means for inserting, by the mobile node, the session information into the packets;
means for sending the plurality of packets from the mobile node to the Tier 2 network element to establish a second communication session, the Tier 2 network element configured to retrieve data from the network attachment point to establish the second communication session; and
means for establishing the second communication session using the Tier 2 network element.

11. A network system for supporting one or more communication sessions at a mobile node, comprising:
a Tier 2 network element of a second network system; and
a mobile node operable to:
identify a plurality of available communication sessions;
receive shared information from a Tier 1 element of a first network system, the shared information comprising a network element address and session information, the network element address identifying the Tier 2 network element of the second network system, the session information identifying at least one network attachment point used by the mobile node to connect to the first network system;

execute a decision procedure to select the second communication session from the plurality of available communication sessions;

insert the network element address into a plurality of packets to bypass the Tier 1 network element to communicate directly with the Tier 2 network element;

insert the session information into the packets;

send the plurality of packets from the mobile node to the Tier 2 network element to establish a second communication session, the Tier 2 network element configured to retrieve data from the network attachment point to establish the second communication session; and facilitate initiation of the second communication session using the Tier 2 network element.

12. The network system of claim 11, the mobile node further operable to:

communicate a first plurality of packets using the first communication session while communicating a second plurality of packets using the second communication session.

13. The network system of claim 11, the mobile node further operable to:

communicate a first plurality of packets using the first communication session while communicating a second plurality of packets using the second communication session, the first plurality of packets communicating a first type of information, the second plurality of packets communicating a second type of information.

14. The network system of claim 11, the mobile node further operable to:

terminate the first communication session to perform a handover procedure.

15. The network system of claim 11 further comprising:

a translator operable to provide a communication procedure to the mobile node;

wherein:

the mobile node is further operable to communicate with the Tier 2 network element by using the communication procedure.

16. A network system for supporting one or more communication sessions at a mobile node, comprising:

a Tier 2 network element of a second network system;

a translator operable to provide a communication procedure; and a mobile node operable to:

identify a plurality of available communication sessions;

execute a decision procedure to select the first communication session from the plurality of available communication sessions;

receive shared information from a Tier 1 element of a first network system, the shared information comprising a network element address and session information, the network element address identifying the Tier 2 network element of the second network system, the session information identifying at least one network attachment point used by the mobile node to connect to the first network system;

communicate with the first interior network element by using the communication procedure from the translator;

insert the network element address into a plurality of packets to bypass the Tier 1 network element to communicate directly with the Tier 2 network element;

insert the session information into the packets;

send the plurality of packets from the mobile node to the Tier 2 network element to establish a second communication session, the Tier 2 network element configured to retrieve data from the network attachment point to establish the second communication session;

facilitate initiation of the second communication session using the Tier 2 network element;

communicate a first plurality of packets using the first communication session while communicating a second plurality of packets using the second communication session, the first plurality of packets communicating a first type of information, the second plurality of packets communicating a second type of information; and terminate the first communication session to perform a handover procedure.

\* \* \* \* \*